United States Patent [19]

Horton

[11] 4,124,051

[45] Nov. 7, 1978

[54] SHOCK ABSORBING WHEEL HUB

[76] Inventor: William E. Horton, 711 Sunset Rd., Henderson, Nev. 89015

[21] Appl. No.: 704,114

[22] Filed: Jul. 9, 1976

Related U.S. Application Data

[63] Continuation-in-part of Ser. No. 579,476, May 21, 1976, abandoned, which is a continuation-in-part of Ser. No. 483,147, Jun. 26, 1974, Pat. No. 3,915,503.

[51] Int. Cl.² .................. B60B 11/04; B60C 5/00
[52] U.S. Cl. .................. 152/155; 152/209 A; 152/376; 301/11 KL; 301/12 R; 301/36 R; 301/39 T; 301/97
[58] Field of Search .......... 152/376, 155, 156, 209 R, 152/209 A, 341, 342; 301/11 R, 11 KL, 12 R, 12 M, 36 R, 36 WP, 39 R, 39 T, 63 R, 64 SD, 70, 97

[56] References Cited

U.S. PATENT DOCUMENTS

| | | | |
|---|---|---|---|
| 1,377,634 | 5/1921 | Slick | 301/63 R |
| 1,639,991 | 8/1927 | French | 301/11 R |
| 1,743,944 | 1/1930 | Watrous | 301/64 SD |
| 2,107,950 | 2/1938 | Lejeune | 301/64 SD X |
| 2,127,075 | 8/1938 | Venosta | 152/376 X |
| 2,612,929 | 10/1952 | Yeggy | 152/209 R |
| 3,155,429 | 11/1964 | Metzler | 301/39 TX |
| 3,463,552 | 8/1969 | Colletti | 301/36 R |

FOREIGN PATENT DOCUMENTS 7,221 7/1905 United Kingdom .................. 301/39 T

*Primary Examiner*—Robert B. Reeves
*Assistant Examiner*—Francis J. Bartuska
*Attorney, Agent, or Firm*—Richards, Harris & Medlock

[57] ABSTRACT

Disclosed is a shock absorbing wheel hub for attachment to the axle of a vehicle. The hub has a central flange portion and an annular rim. The rim has a pair of spaced mounting surfaces formed on the periphery thereof for attaching a pair of pneumatic tires with inclined road-engaging treads. A flange is formed on the rim between the mounting surfaces and extends radially outward between the tires. A cylindrical contact surface is formed on the exterior of the flange and carries a tread thereon. The central flange is provided with bores for attachment to the lug bolts of a vehicle axle. Circumferentially spaced resilient spokes extend radially from the central flange and are connected to the hub. A pair of inflation check valves are attached to the rim to communicate respectively with the interior of each pneumatic tire. A flow passage is provided in the rim interconnecting the pneumatic tires for allowing air flow therebetween. An interchangeable flow restricter is mounted in the rim for controlling the flow of air between the two tires. In another embodiment, the spokes have semispherical bearing surfaces formed thereon resiliently held in receptacles formed in the rim. In yet another embodiment, the road-engaging surfaces of the tires are curved from side to side.

13 Claims, 7 Drawing Figures

SHOCK ABSORBING WHEEL HUB

REFERENCE TO RELATED APPLICATIONS

This application is a Continuation-in-Part of an earlier filed co-pending application entitled "Shock Absorbing Wheel Hub", Ser. No. 579,476 filed May 21, 1976, now abandoned, which was a Continuation-in-Part of co-pending application Ser. No. 483,147 filed June 26, 1974, entitled "Automobile Wheel", now U.S. Pat. No. 3,915,503.

BACKGROUND OF THE INVENTION

The present invention relates generally to wheels for use on vehicles. In another aspect, the present invention relates to a safety wheel for use in attaching pneumatic tires to a vehicle which minimizes the danger resulting from blowout of the tires and provides improved control stability of the tire. In addition, resilient spokes are provided in the wheel and act as springs to smooth the ride of the vehicle.

In the design of wheeled vehicles, such as automobiles, trucks, trailers, and the like, it has been common to use pneumatic tires to obtain a smooth and comfortable ride. These pneumatic tires are conventionally mounted on the exterior of a metallic rim and are inflated through a check valve attached to the rim. The tires are conventionally manufactured with an outer wall constructed from a flexible material.

Although these pneumatic tires provide a soft, comfortable ride, they have not been entirely satisfactory under all conditions of service. One undesirable aspect is that if a sharp object inadvertently comes into contact with a tire, a hole or puncture can be formed in a tire allowing the tire to deflate, thus suddenly reducing the tire's effective radius. This sudden reduction in the effective radius of a tire of a vehicle moving at a high rate of speed can make steering and control difficult, if not impossible during the dangerous period while the vehicle is decelerated to a safe speed. In addition, damage can be caused to the tire by it's being compressed between the rim and the roadway during the bringing of the automobile to a halt. Also, movement of the vehicle to a safe place where the tire may be removed is difficult with these conventional tires.

It has also been conventional to use wheels having more than one tire thereon. These conventional dual tire wheels, when used on the front of highway vehicles, tend to wobble at high speeds.

SUMMARY OF THE INVENTION

Therefore, according to the present invention, an improved safety wheel is provided having a pair of parallel mounted pneumatic tires thereon and a flange which extends substantially outward between the pair of pneumatic tires to support the vehicle when the tires become deflated and prevent damage to the tires. A passageway is formed in the wheel to interconnect the chambers of the pneumatic tires to equalize the pressure therein to improve the performance of the tires. In addition, an interchangeable flow controlling device is provided to control the flow of air through the passageway between the two tires. A desired flow rate through the chamber can be obtained by placing the appropriate flow control device in the wheel, thus making the wheel have universal application for various vehicles.

The present invention also contemplates the use of unique pneumatic tires having road-engaging treads which are inclined toward the outside of the tire. This narrows the running drag of the tire, making steering easier and reducing lateral wheel stresses.

The present invention also contemplates the use of a two-piece hub structure whereby a rim is formed of aluminum material and wherein a steel central flange portion is fixed to the rim. The central portion is provided with a plurality of resilient spokes which absorb shock and reduce overall stresses in both radial and lateral directions.

The present invention also contemplates the use of a two-piece hub structure whereby the spokes of the central flange portion are connected to the rim by ball-receptacle type connections whereby the freedom of movement between the rim and spokes assists in absorbing radial and lateral shock and stress.

The present invention also contemplates the use of wheels with tire treads which are curved from side to side to reduce waffle.

More particularly, the present invention contemplates the use of the hub having an aluminum rim with a pair of annular pneumatic tire mounting surfaces for supporting a pair of pneumatic tires thereon in a spaced relationship. The tires have treads which are inclined in a direction toward the outside of the wheel. A restricted flow passage is formed in the rim and interconnects the pneumatic tires to maintain the tires at an equal pressure in operation. A removable flow control device is provided to control the flow of air through the flow passage to regulate the deflation of one tire upon loss of pressure in the other tire. A pair of inflation check valves are provided in the rim for separately inflating the tires. A flange is provided on the rim between the tires to extend radially outward a substantial distance for supporting the vehicle when the tires are inflated. A steel center spoke assembly is provided for connecting the rim to the axle of the vehicle. The center spoke assembly has a plurality of radially extending resilient spokes which engage the rim and resiliently connect the rim to the axle. In one embodiment, tabs are formed on the spokes and mate with corresponding shaped receptacles in the rim. In another embodiment, semispherical bearing surfaces are formed on the spokes and engage receptacles in the rim.

The advantages of the present invention will be appreciated by those of ordinary skill in the art as the same becomes better understood by reference to the following detailed description when considered in connection with the accompanying Drawings in which:

DESCRIPTION OF THE PREFERRED EMBODIMENT

Figure 1:
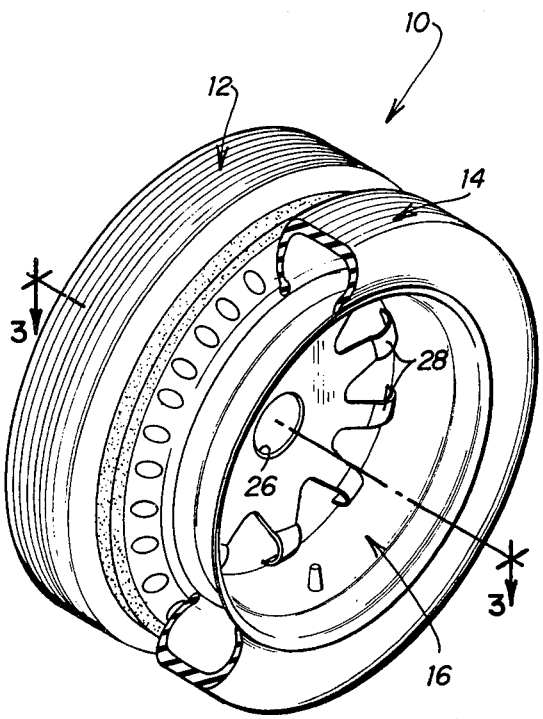
FIG. 1 illustrates a perspective view of one embodiment of a wheel shown partly in section and incorporating the present invention.

Referring now to the Drawings wherein like reference characters designate like or corresponding parts throughout the several views, there is illustrated in FIGS. 1 through 4 a first embodiment of a wheel which, for purposes of description, is generally identified by reference numeral 10. As will be described herein, the wheel 10 is designed to protect against blowout while improving tire stability. The wheel 10 has two pneumatic tires 12 and 14 mounted on an improved hub 16. The tires 12 and 14 are not conventional in design as will be hereinafter described.

The hub 16 is formed in two parts. One part is formed by central flange portion 18 and the other by a rim 20. The portion 18 has an internally-extending annular flange 22 for attaching the rim to an axle of a vehicle. The flange 22 has a plurality of bores 24 for connection to the lug bolts of an axle. A central clearance opening 26 is formed in the flange 22 to provide clearance for the bearings of the axle. Eight resilient spokes 28 extend radially from the portion 18 and engage the rim portion 20. Each spoke 28 has a curved portion 30 which extends from the flange 22. The thickness of the curved portions decreases as the curved portion 30 extends away from the flange 22. A tab 32 is formed on the end of each of the curved portions 30. These tabs 32 extend in a radial direction away from the center of the portion 18. Eight receptacles 34 are formed inside of the rim 20 and are of a size and shape to receive the tab 32 therein to connect the rim 20 to portion 18.

In the preferred embodiment, the portion 18 is formed from a steel material whereas the rim 20 is formed from aluminum. The shape of the spokes 28 is such that the tabs 32 will be resiliently held in the receptacles 34. In addition, the flexibility of the curved portion 30 of the spoke portion 18 allows both radial and torsional flexure of the hub during operation and use.

A pair of parallel spaced tire mounting surfaces 36 and 38 are formed on the exterior of the rim 20 to allow mounting, respectively, of tires 12 and 14. Surfaces 36 and 38 are conventional in the design and are provided with suitable ridges for receiving the tires 12 and 14 and to mount the same on the rim 20. A pair of conventional tire inflation check valves 40 are mounted in the wall of the rim 20 for use in inflating the tires 12 and 14. These inflation valves 40 can be connected to a source of pressurized air to cause the air to enter the interior of the tire while preventing the escape of air after the source is removed.

According to a particular feature of the present invention, the tires 12 and 14 have treads 42 which are inclined at an angle "X" in a direction to the outside of the tire. In the preferred embodiment, this angle "X" is 10°. By slanting the tire treads, the dual tires of the wheel tend to perform in steering as a single larger tire. This is because the running drag of the dual tire is narrow and close to the wheel's center of pressure making steering easier and reducing lateral wheel stresses.

The rim 20 is also provided with a port or passageway 44 connecting the interior of the two tires 12 and 14. This passageway allows air between the two tires to equalize the pressure in the tires during operation thereof. In the disclosed embodiment, a flow restricter 46 is mounted in a socket 48 formed at the end of the passageway inside of the tire 12. The socket 48 is of a size to receive the flow restricter 46 therein. Internal threads can be provided in the socket and external threads provided on the restricter for mounting and removing the restricter 46. According to a particular feature of the present invention, the restricter will control the rate of flow of air between the two tires. In addition, the restricter 46 can be removed and a substitute restricter with a different control flow rate can be placed in the socket 48 to provide flow characteristics for different use environments.

Figure 3:
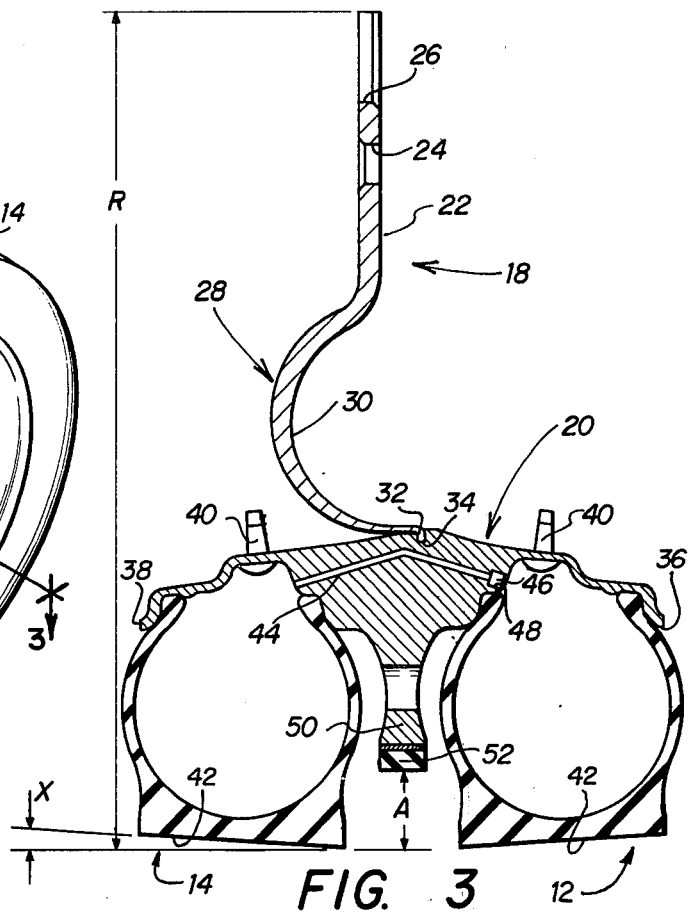
FIG. 3 illustrates a section of the device taken along line 3—3 of FIG. 1, looking in the direction of the arrows.

According to a particular feature of the present invention, a radially extending flange 50 is formed on the rim 20 to extend from the exterior thereof. The flange 50 is positioned to extend between the tires 12 and 14. The effective radius R of the inflated wheel 10 is shown in FIG. 3. The flange 50 extends to the proximity of the roadway, as is illustrated in FIG. 3, and has a clearance distance identified by "A". This distance "A" is normally of a mangnitude of 1½ inches, but can vary with different sizes of wheels.

According to a particular feature of the present invention, the flange 50 extends a substantial distance outwardly from the mounting surfaces to prevent undesirable compression of the deflated tire between the rim and the roadway. This avoids damage to the tire occasioned by compression of the tire due to the weight of the vehicle resting on the rim.

It is also to be noted that the flange 50 is positioned in planar proximity with the mounting flange 22 so that upon failure of the tire, the flange 50 will be centrally positioned with respect to the rim. A tread 52 is attached to the exterior of the cylindrical surface of the flange 50 for use in contacting the road upon failure of the tires.

Figure 4:
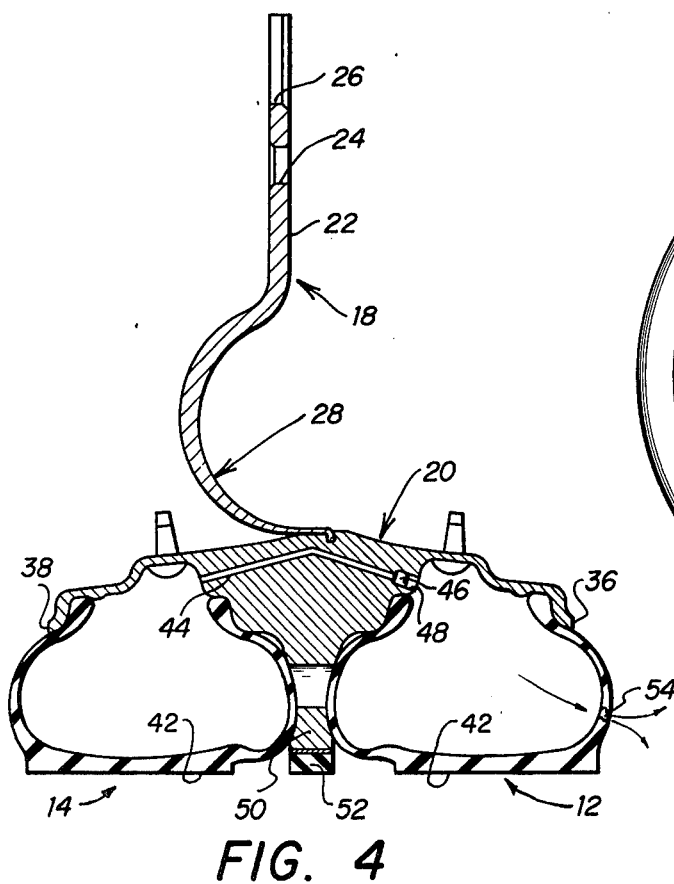
FIG. 4 is a view similar to FIG. 3 illustrating the embodiment of FIG. 1 with one of the tires punctured.
Figure 2:
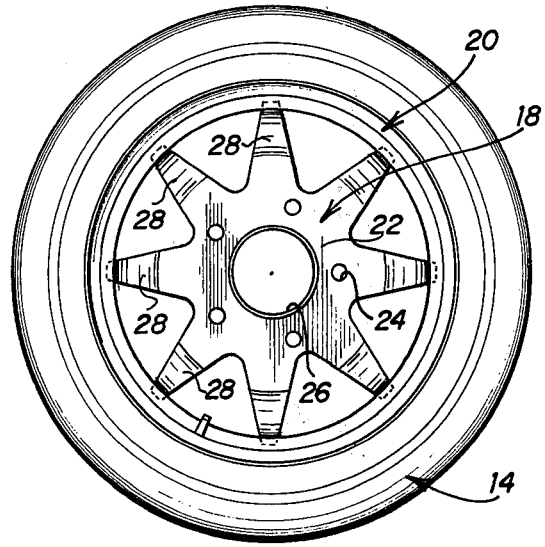
FIG. 2 illustrates a side elevation of the wheel illustrated in FIG. 1.

In FIG. 4, the wheel 10 is shown with a blowout puncture 54 in the side of tire 12. This puncture 54 could be caused by contact between the tire 12 and a sharp object in the roadway. The puncture 54 allows air to quickly escape from the tire as shown by the arrows. This release of air from the interior of the tire 12 will allow the tire to deflate, thus reducing its effective support radius. The other tire 14 will then support the vehicle for a short period of time (presumably one minute) while air flows through the passageway 44 and flow restricter 46 from the tire 14 to the tire 12 and out the puncture 54. The flow restricter 46 can be changed to provide a desired deflation rate. The rate of flow is set such that the air will slowly deflate the tire 14 to slowly lower the axle and change the effective radius of the wheel 10 until the tread 52 contacts the roadway as illustrated in FIG. 4. This prevents an abrupt change in the effective radius of the wheel and gradually lowers the wheel 10 until treads 52 contact the roadway. In the present embodiment, this lowering process can extend up to one minute. In this position, the wheel has been lowered to the roadway and its effective radius shortened at distance "A" to allow contact with the roadway.

In addition, it can be seen that the passageway 44 not only maintains the tires 12 and 14 at an equal pressure during operation of the wheel, but also allows a controlled gradual lowering of the flange 50 if one of the tires should quickly lose its pressure. In addition, the flange 50 is positioned directly under the connection to the axle of the vehicle. This facilitates steering of the vehicle when the tire is in the deflated condition, as illustrated in FIG. 4. In addition, the substantial outward extension of the flange 50 prevents damage to the tires 12 and 14 when deflated by reason of the rim crushing the tire wall between the roadway and rim. This keeps the weight of the vehicle off the deflated tire and will prevent it from being flattened, crushed or damaged any further by the wheel rim 20 or the flange 50.

Figure 5:
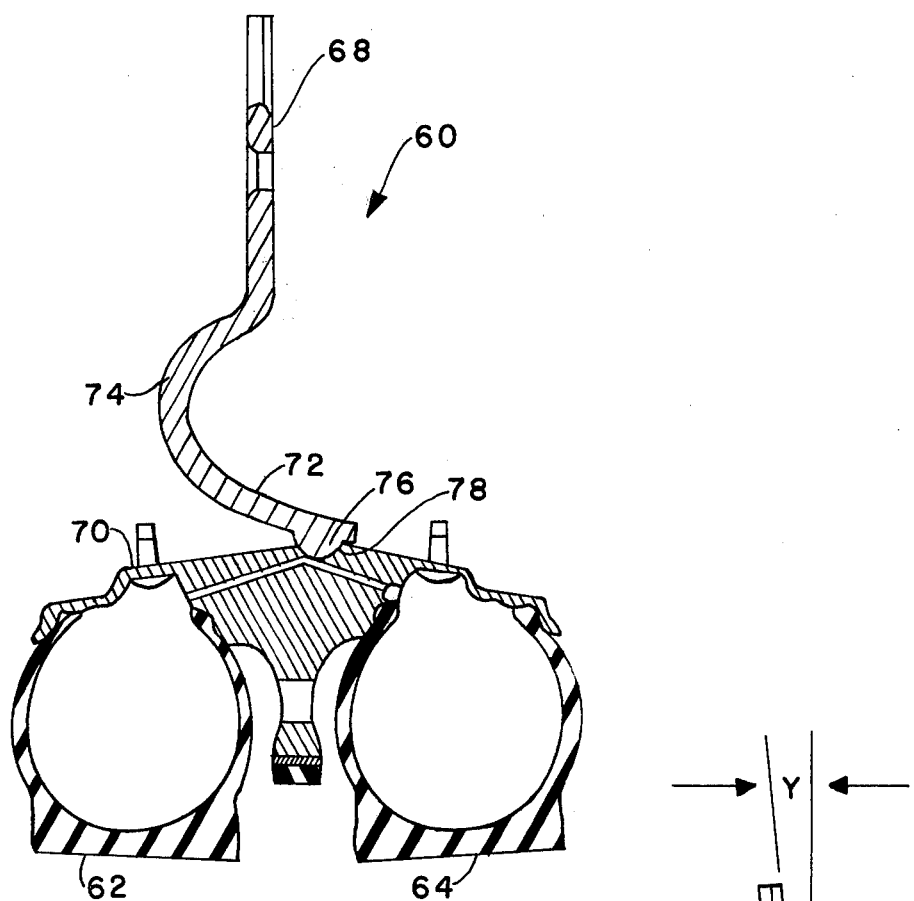
FIGS. 5 and 6 are views similar to FIG. 3 illustrating a second embodiment of the device.
Figure 6:
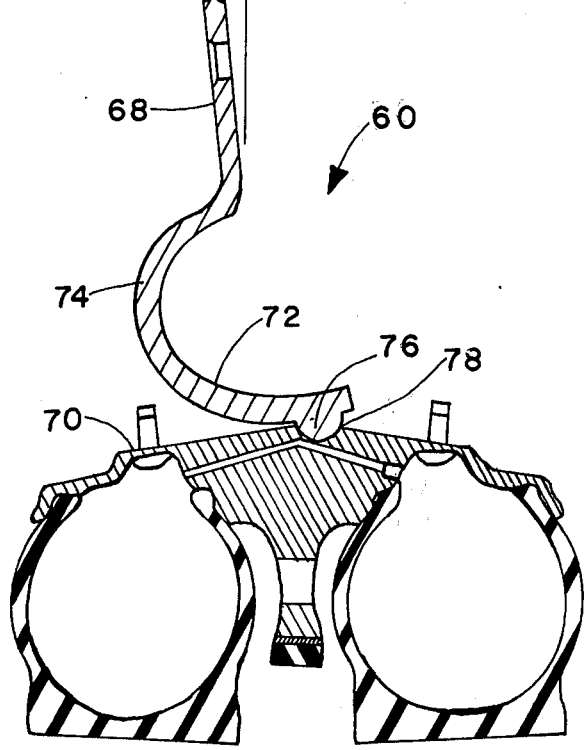

In FIGS. 5 and 6, a second embodiment of the wheel 60 is illustrated. The wheel 60 is similar in most regards to the embodiment illustrated in FIGS. 1-4 and has two pneumatic tires 62 and 64 mounted on the improved hub. The tires 62 and 64 are not conventional in design and are identical to tires 12 and 14 described with reference to FIGS. 1-4.

As was described with respect to the first embodiment, the hub is formed in two parts. One part is formed by a central flange portion 68 and the other by a rim 70. The flange portion 68 is identical in construction to the portion 18 of FIGS. 1-4 except that spokes 72 are somewhat different shaped. The spokes 72 extend radially from the axle and engage a portion of the rim. Each of the spokes 72 has a curved portion 74 with a semispherical ball portion 76 formed on the extremity thereof. As seen in FIGS. 5 and 6, the thickness of the spokes 72 is constant even though their width varies as in the first embodiment.

The rim 70 is identical in construction to the rim 20 except that the receptacles 34 are replaced by semispherical receptacles 78 of a size to receive the balls 76 thereon. The balls 76 are retained in the receptacles 78 by the resilient action of the curved portions 76 of the spokes 72. The exterior surface of each ball 76 and the interior surface of the corresponding receptacles 78 will cooperate to allow relative movement between the rim and the spokes. This relative movement provides a shock-absorbing effect and will tend to reduce overall stresses in both radial and lateral directions at the point of contact between the rim and the spoke. This freedom of movement between the rim and the spoke will reduce the possibility that the aluminum rim will break from the bending and twisting action of the ends of the spokes.

This movement is best illustrated in FIG. 6 wherein the flange portion 68 is illustrated deflected an angle "Y" on the vertical while the tires 62 and 64 of the rim 70 remain in contact with the road surface. In this view, it can be seen that the receptacles 78 and the balls 76 will provide relative movement between the spokes and the rim, thus reducing the stresses induced in this operational configuration.

It is also to be understood that the slanting of the tires at an angle "X" provides improvements in the performance of the tire while the spokes can absorb torsional, side and radial loads on the wheel. In the second embodiment, the ball-socket connection between the spokes and rim add to the load absorption characteristics of the rim. In addition, the spokes reduce cracking problems in the hub due to temperature expansion and contraction as a result of the temperature changes therein. By forming the rim from aluminum and the spoke portions from steel, the strength and resiliency of the steel in the area where the cracks are normally formed can be utilized. By using an aluminum rim, the advantages of low weight of aluminum materials can be utilized.

Figure 7:
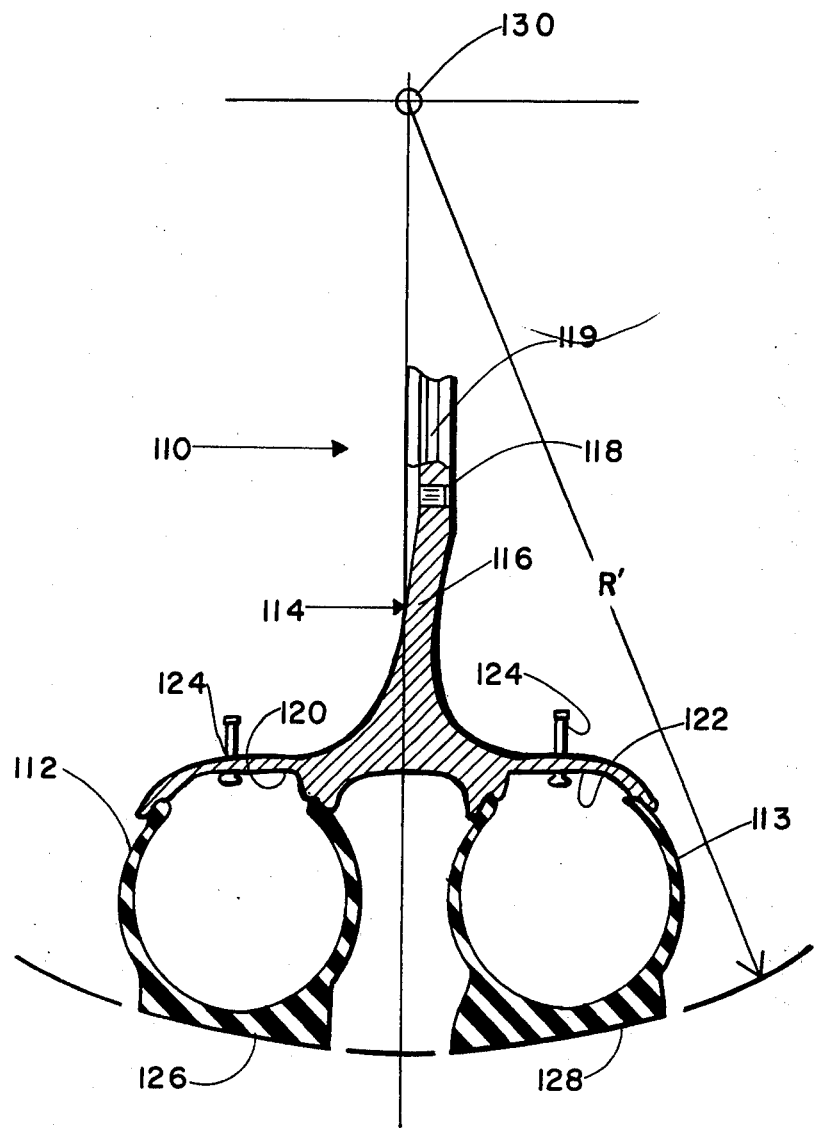
FIG. 7 is a view similar to FIG. 3 illustrating a third embodiment of the device.

In FIG. 7, another embodiment of a wheel is illustrated and is generally identified by the reference numeral 110. The wheel 110 has two pneumatic tires 112 and 113 mounted on a rim 114. The rim 114 has an internally extending annular flange 116 for attaching the rim to an axle of a vehicle such as an automobile. The flange 116 has a plurality of bores 118 for connection to the lug bolts of an axle. A central clearance opening 119 is formed in the flange 116 to provide clearance for the bearings of the axle.

A pair of parallel spaced tire mounting surfaces 120 and 122 are provided on the exterior of the rim 114 to allow mounting, respectively, of tires 112 and 113. Surfaces 120 and 122 are conventional in design and are provided with suitable ridges for receiving the tires 112 and 113 and to mount the same on the rim 114. A pair of conventional tire inflation check valves 124 are mounted in the wall of the rim 114 for use in inflating the tires. It is also envisioned, of course, that the passageway and control valve of FIGS. 1-6 could be provided in the embodiment. In addition, the rim 114 of the present embodiment could be provided with outwardly extending flange 50 shown in FIGS. 1-6.

According to a particular feature of the present invention, each of the tires 112 and 113 are provided with road-engaging surfaces 126 and 128, respectively, which are curved from side to side as shown. In the illustrated embodiment, all points in the surfaces 126 and 128 are spaced an equal distance "R'" from the center 130 of rotation of the wheel 110.

It is believed that when used, this embodiment will shift the vertical tire load of each tire and their running drag toward each other to a common center. As the loads are shifted the effect will be to eliminate the tendency of the dual tire to wabble and make steering easier.

It is to be understood, of course, that the foregoing disclosure relates only to the preferred embodiment of the present invention, and that numerous alterations may be utilized to practice the present invention without departing from the spirit and scope of the invention as defined in the appended claims.

What is claimed is:

1. A safety wheel comprising a cylindrical rim, a pair of parallel spaced tire mounting surfaces on said rim, a pair of pneumatic tires mounted on said surfaces, said tires having road contact tread surfaces which are inclined in a direction toward the outside edge of the wheel, a flange means on said rim between said mounting surfaces extending substantially outward in a radial direction for supporting said wheel, a contact surface formed on the exterior of said flange means, a tread on said contact surface, inflation check valves attached to said rim for communicating, respectively, with the interior of each of said tires, a flow passage in said rim communicating between the interior of said two tires, socket means in said rim, a flow regulator means releasably mounted in said socket means for regulating the flow of air through said passage whereby the flow rate may be changed by mounting a different regulator means in said socket means and for selectively deflating one tire upon loss of pressure in the other tire to gradually engage the tread of said contact surface with the roadway, a mounting flange portion, means on said mounting flange portion for attachment to the axis of a vehicle, and a plurality of resilient curved spokes connecting said mounting flange portion to said rim.

2. The wheel of claim 1 additionally comprising balls formed on said spokes and a plurality of receptacles in said rim each engaging one of said balls.

3. A safety wheel comprising:
   (a) a rim, a pair of parallel spaced annular tire mounting surfaces formed on the exterior of said rim, and a flange extending substantially in a radial direction between said surfaces, contact surface means formed on the exterior of said flange;

(b) a mounting flange portion, means on said flange for attachment to the axle to a vehicle, and a plurality of resilient spokes connecting said mounting flange portion to said rim, said resilient spokes elastically flexing in response to axial and lateral forces to absorb shock and stress; and (c) a flow passage in said rim extending between said mounting surfaces and a socket in said rim, a flow regulator means releasably mounted in said socket for regulating the flow of air through said passage whereby the flow rate may be changed by mounting a different regulator means in said socket.

4. A vehicle wheel comprising in combination:

(a) a rim, means on said rim facilitating attachment to the axle, a pair of parallel spaced tire mounting surfaces on the exterior of said rim, and flange means on the rim extending radially from said rim for preventing damage to said tires when deflated by compression of said tires between said rim, flange and said roadway;

(b) at least two distinct tires on said mounting surfaces with distinct tread surfaces on each of said tires for engaging the road surface, said tread surfaces being inclined with respect to the axis of wheel rotation, the effective radius of the tires being smaller at the outside edge than the inside edge; and (c) a flow passage in said rim extending between said mounting surfaces and a socket in said rim, a flow regulator means releasably mounted in said socket for regulating the flow of air through said rim whereby the flow rate may be changed by mounting a different regulator means in said socket.

5. A safety wheel for mounting a pair of pneumatic tires on a vehicle axle, comprising:

a rim, a flange on said rim positioned between said mounting surfaces, said flange extending substantially radially from said rim, means on said rim facilitating attachment of said rim to the axle of a vehicle, a pair of parallel spaced mounting surfaces for mounting the tires in a spaced parallel relationship on the exterior of said rim, flow passage in said rim for interconnecting the interior of the tires, a socket in said rim, a flow regulator means releasably mounted in said socket for regulating the flow rate through said passage, and for selectively deflating one tire upon sudden loss of pressure in the other tire to gradually engage said flange with the roadway.

6. The wheel of claim 5 wherein said means facilitating attachment to the axle comprising a mounting flange portion, and a plurality of resilient spokes connecting on said mounting flange portion connected to said rim for flexing elastically in response to axial and lateral forces to absorb shock and stress.

7. A safety wheel comprising a cylindrical rim, a pair of parallel spaced tire mounting surfaces on said rim, a pair of distinct tires mounted on said surfaces, said tires having distinct road contact tread surfaces which are curved from side to side of the tire, a flange on said rim between said mounting surfaces extending substantially outward in a radial direction, a contact surface formed on the exterior of said flange, a tread on said contact surface, inflation check valves attached to said rim for communicating, respectively, with the interior of each of said tires, a flow passage in said rim communicating between the interior of said two tires, socket means in said rim, a flow regulator means releasably mounted in said socket means for regulating the flow of air through said passage whereby the flow rate may be changed by mounting a different regulator means in said socket means and for selectively deflating one tire upon sudden loss of pressure in the other tire to gradually engage the tread of said contact surface with the roadway, a mounting flange portion, means on said mounting flange portion for attachment to the axis of a vehicle, and a plurality of resilient curved spokes connecting said mounting flange portion to said rim.

8. The wheel of claim 7 additionally comprising balls formed on said spokes and a plurality of receptacles in said rim each engaging one of said balls.

9. A vehicle wheel comprising in combination:

(a) a rim, means on said rim facilitating attachment to the axle, a pair of parallel spaced tire mounting surfaces on the exterior of said rim, and flange means on the rim extending radially from said rim for preventing damage to said tires when deflated by compression of said tires between said rim, flange and said roadway;

(b) two distinct tires on said mounting surfaces, distinct tread surfaces on said tires for engaging the road surface, said tread surface being curved from side to side of said tire, the effective radius of the tire being smaller at the outside edge than the inside edge; and (c) a flow passage in said rim extending between said mounting surfaces and a socket in said rim, a flow regulator means releasably mounted in said socket for regulating the flow of air through said rim whereby the flow rate may be changed by mounting a different regulator means in said socket.

10. A safety wheel for use on an axle of a vehicle, comprising:

(a) a rim having a pair of parallel spaced annular tire mounting surfaces formed on the exterior of said rim, and having a flange extending substantially in a radial direction between said mounting surfaces with contact surface means formed on the exterior of said flange;

(b) a mounting flange portion having means on said flange portion for attachment to the axle of the vehicle;

(c) a plurality of resilient steel spokes extending in an outward radial direction from said mounting flange portion;

(d) a plurality of resilient steel curved portions, one of said steel curved portions extending in an outward radial direction from each of said spokes and curving in a direction normal to the plane defined by said rim;

(e) a ball means disposed on each of said curved portions;

(f) a socket means disposed in said rim for receiving said ball means to allow rotation and twisting of said ball means relative to said socket means; and (g) said steel curved portions having a resilient action to urge said ball means in an outward radial direction to retain said ball means in said socket means, said steel curved portions and said spokes being operable to elastically flex inwardly and outwardly in a radial direction in response to radial forces on said rim to absorb shock and stress, said steel curved portions and said spokes being operable to elastically flex in a lateral direction normal to the plane of the rim, said ball means rotating in said socket means in response to radial and lateral forces on said rim to absorb shock and stress.

11. The wheel of claim 10 wherein said spokes have a cross section area which decreases in a radial outward direction.

12. The wheel of claim 10 wherein receptacles are formed in said rim and wherein said spokes have tabs formed thereon which engage said receptacles.

13. The wheel as set forth in claim 10 wherein said ball means comprises a semispherical ball and said receptacle means comprises a semispherical receptacle in said rim dimensioned to receive said ball.

* * * * *